April 13, 1926.   1,580,526
W. A. O'TOOLE
ADJUSTABLE WEDGE FOR LOCOMOTIVE DRIVE BOXES
Filed Oct. 7, 1925   2 Sheets-Sheet 1
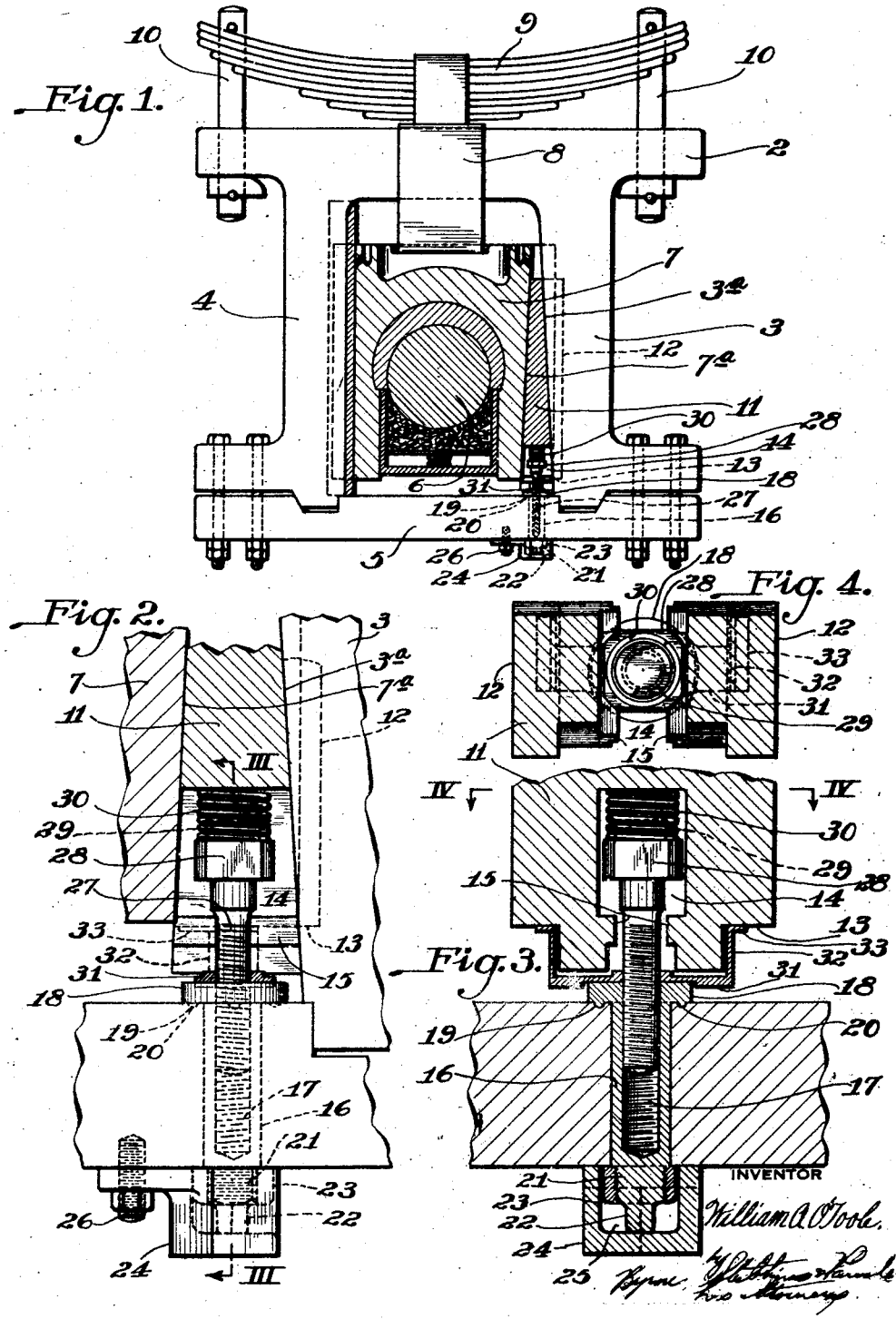

April 13, 1926.
W. A. O'TOOLE
1,580,526
ADJUSTABLE WEDGE FOR LOCOMOTIVE DRIVE BOXES
Filed Oct. 7, 1925     2 Sheets-Sheet 2
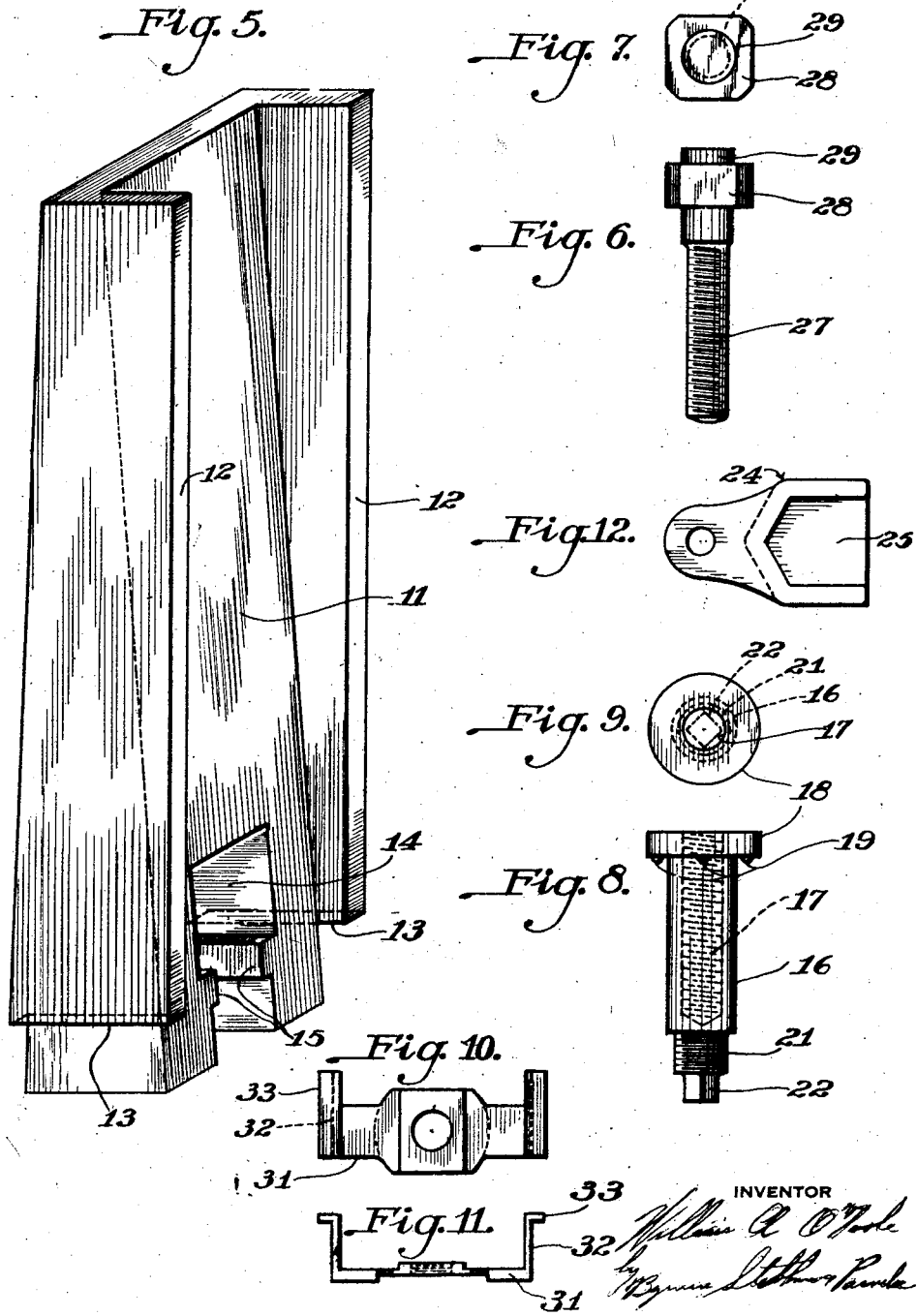

wedge will be urged upwardly by the spring 30 to compensate for the wear that develops and to prevent lateral movement between the drive box and the pedestal. This automatic adjustment of the wedge, by the expansion of the spring 30, will continue until the elastic limit of the spring 30 has been reached, or until the under side of the head 28 contacts with the rib 15. When this condition is reached, the terminals 33 of the indicator will be spaced a corresponding distance away from the shoulders 13. An inspector examining the locomotive can readily gauge whether the wedge bolt needs to be further adjusted by noting the distance between the top of the terminals 33 and the under sides of the shoulders 13. If the distance between the terminals 33 and the shoulders 13 indicates that substantially no further automatic adjustment of the wedge can take place by reason of the expansion of the spring 30, the bracket 24 is removed, nut 23 is loosened and the sleeve 16 is rotated to again restore the parts to the position shown in Figure 3. Repeated adjustments can be made until the wedge requires relining, at which time the bolt 27 will be extended upwardly to its highest position in its respect to the sleeve 16.

When the wedge has been adjusted to its limit, it may be removed for the purpose of relining it, as is the usual practice. To remove the wedge for relining, bracket 24 is removed and nut 23 is rotated. The sleeve 16 may be rotated to the left, causing the sleeve to screw up on the bolt, lifting flange 18 off the pedestal brace. If the nut 23 is then tightened, sleeve 16 will be drawn down until flange 18 again bears against the pedestal brace. This serves to pull the wedge down, making it sufficiently loose to be readily removable when the pedestal brace is dropped down.

If desired, indicator 31 can be omitted, but its presence enables an inspector to more readily determine when some adjustment of the wedge bolt is necessary.

I claim as my invention:

1. An adjusting screw mechanism for drive box wedges including an interiorly threaded sleeve having an exteriorly threaded end portion, a lock nut on said exteriorly threaded end portion, a bolt threaded into said sleeve, and a compressible wedge supporting element on the outer end of said bolt.

2. An adjusting screw mechanism for drive box wedges including an interiorly threaded sleeve having a flange at one end thereof and being exteriorly threaded at its other end, a lock nut on said exteriorly threaded portion, and a bolt screwed into the sleeve.

3. An adjusting screw mechanism for drive box wedges including an interiorly threaded sleeve having a flange at one end thereof and being exteriorly threaded at its other end, a lock nut on said exteriorly threaded portion, a bolt screwed into the flanged end of the sleeve, a compressible wedge supporting element on the outer end of said bolt, a wedge supported by the compressible element, and an indicator on the bolt below the wedge.

4. The combination with a locomotive frame or the like having pedestal legs and a pedestal brace connecting the legs, and a drive box between the pedestal legs, of a wedge interposed between the drive box and one of the pedestal legs, a sleeve member rotatably mounted in the pedestal brace and passing through the brace, said sleeve being interiorly threaded, a bolt under the wedge threaded into the sleeve, and a spring interposed between the bolt and wedge for yieldably supporting the wedge on the bolt.

5. The combination with a locomotive frame having a pedestal, a drive box contained in the pedestal and a pedestal brace below the drive box, of a wedge between the drive box and the pedestal, a bolt engaging the lower end of the wedge and non-rotatable with respect thereto, said wedge being vertically movable with respect to the bolt, a spring interposed between the top of the bolt and the wedge for urging the wedge upwardly with respect to the bolt, and a sleeve rotatably mounted in the pedestal brace and operatively connected with the bolt.

6. The combination with a locomotive frame including a pedestal and pedestal brace with a drive box in the pedestal above the pedestal brace, of a wedge associated with the drive box, said wedge having a transverse slot in the lower end thereof which slot is restricted toward the bottom of the wedge, a bolt having a non-circular head entered into the slot and the wedge, a spring on the top of the bolt for urging the wedge upwardly with respect thereto, and an adjusting sleeve rotatably carried in the pedestal brace to which the bolt is threaded.

7. The combination with a locomotive frame including a pedestal and pedestal brace with a drive box in the pedestal above the pedestal brace, of a wedge associated with the drive box, said wedge having a transverse slot in the lower end thereof which slot is restricted toward the bottom of the wedge, a bolt having a non-circular head entered into the slot and the wedge, a spring on the top of the bolt for urging the wedge upwardly with respect thereto, and an adjusting sleeve rotatably carried in the pedestal brace to which the bolt is threaded, said sleeve having a flange at the top thereof adapted to engage the top of the pedestal brace and having a lock nut at the bottom thereof.

8. The combination with a locomotive frame including a pedestal and pedestal brace with a drive box in the pedestal above the pedestal brace, of a wedge associated with the drive box, said wedge having a transverse slot in the lower end thereof which slot is restricted toward the bottom of the wedge, a bolt having a non-circular head entered into the slot and the wedge, a spring on the top of the bolt for urging the wedge upwardly with respect thereto, an adjusting sleeve rotatably carried in the pedestal brace to which the bolt is threaded, said sleeve having a flange at the top thereof adapted to engage the top of the pedestal brace and having a lock nut at the bottom thereof, and a bracket on the under side of the pedestal brace cooperating with the sleeve and with the nut.

9. The combination with a pedestal of a locomotive frame having a pedestal brace thereon and having a drive box therein, of an adjusting sleeve rotatably mounted in the pedestal brace, a wedge cooperatively associated with the drive box and the pedestal, a bolt threaded into the sleeve and non-rotatably engaging the head, and a spring interposed between the top of the bolt and the under face of the wedge.

10. The combination with a pedestal of a locomotive frame having a pedestal brace thereon and having a drive box therein, of an adjusting sleeve rotatably mounted in the pedestal brace, a wedge cooperatively associated with the drive box and the pedestal, a bolt threaded into the sleeve and non-rotatably engaging the wedge, a spring interposed between the top of the bolt and the under face of the wedge, said sleeve having its lower end projecting beyond the bottom of the pedestal brace, and a lock nut on the projecting end of said sleeve.

11. The combination with a locomotive frame having a vertically movable drive box therein and a wedge for compensating for wear between the drive box and the frame, of an adjusting means for the wedge including a sleeve rotatably carried in the locomotive frame, a bolt threaded into the sleeve having its upper end slidable and non-rotatably engaging the wedge, and a spring interposed between the bolt and the wedge.

12. The combination with a pedestal of a locomotive frame having a pedestal brace thereon and having a drive box therein, of an adjusting sleeve rotatably mounted in the pedestal brace and having a flange at the top thereof in contact with the pedestal brace, said flange and pedestal brace having cooperating locking surfaces which serve to normally hold the sleeve against rotation in the pedestal brace, a wedge cooperatively associated with the drive box and pedestal, a bolt threaded into the sleeve and non-rotatably engaging the wedge, a spring interposed between the top of the bolt and the under surface of the wedge, said sleeve having its lower end projecting beyond the bottom of the pedestal brace, and a lock nut on the projecting end of said sleeve.

13. The combination with a locomotive frame or the like having pedestal legs and a pedestal brace connecting the legs, one of said legs having an inclined inner face, of a drive box in the pedestal frame having an inclined face opposed to the said inclined face of the pedestal leg, the inclination of the two faces being opposite, a wedge having oppositely inclined faces thereon interposed between the inclined face of the driving box and the inclined face of the leg, and means for adjustably and yieldably supporting the wedge on the pedestal brace.

In testimony whereof I have hereunto set my hand.

WILLIAM A. O'TOOLE.

April 13, 1926.
W. G. PARMELE
LOCK
Filed July 30, 1925
1,580,527
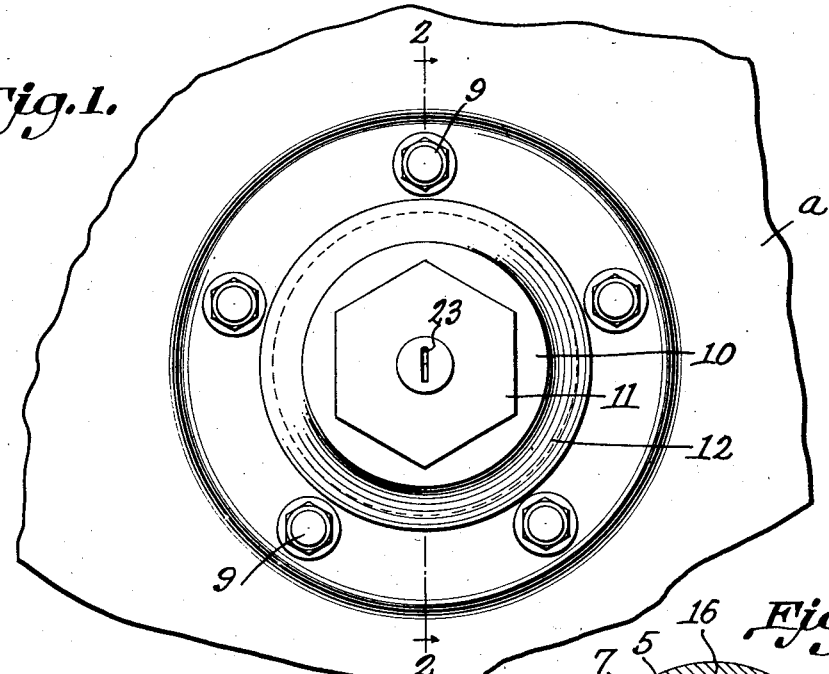
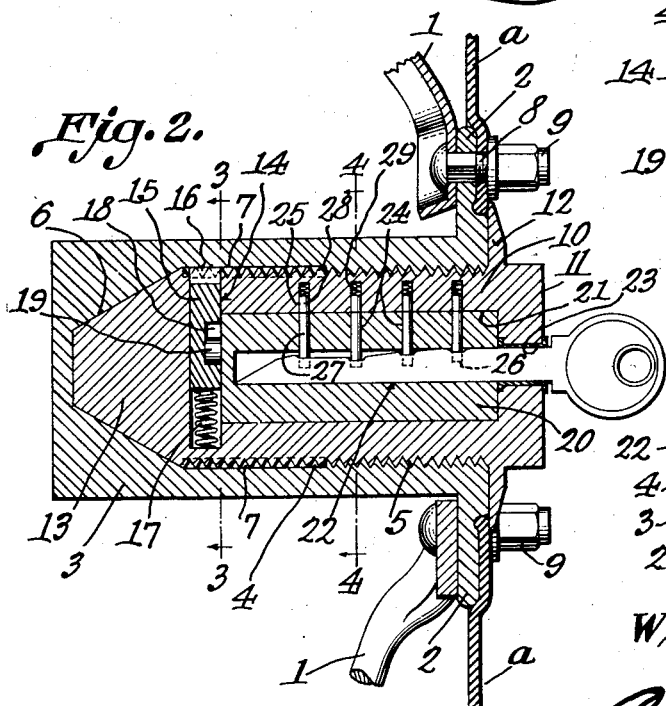
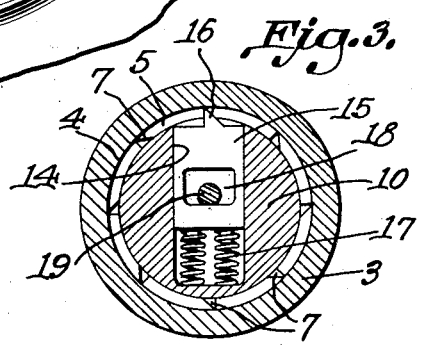
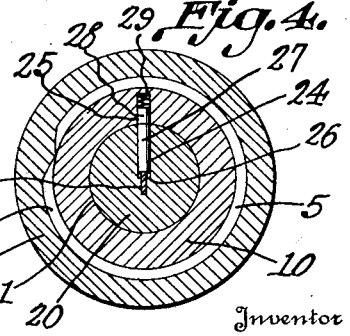
Inventor
William G. Parmele
By C.A. Snow & Co
Attorneys